(12) United States Patent
Rofougaran

(10) Patent No.: US 7,634,246 B2
(45) Date of Patent: Dec. 15, 2009

(54) METHOD AND SYSTEM FOR BLOCKER ATTENUATION USING MULTIPLE RECEIVE ANTENNAS

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 462 days.

(21) Appl. No.: 11/536,688

(22) Filed: Sep. 29, 2006

(65) Prior Publication Data

US 2008/0081588 A1    Apr. 3, 2008

(51) Int. Cl.
*H04B 1/10* (2006.01)
(52) U.S. Cl. .................. 455/272; 455/137; 455/278.1; 375/148
(58) Field of Classification Search .............. 455/193.1, 455/193.2, 272, 273, 276.1, 278.1, 296, 302, 455/304, 137, 138, 139; 375/148
See application file for complete search history.

(56) References Cited

U.S. PATENT DOCUMENTS

| | | | | |
|---|---|---|---|---|
| 4,723,321 A * | 2/1988 | Saleh | ......................... | 455/295 |
| 4,893,350 A * | 1/1990 | Minamisono et al. | ..... | 455/278.1 |
| 5,349,609 A * | 9/1994 | Tsujimoto | .................. | 375/347 |
| 5,487,091 A * | 1/1996 | Jasper et al. | ................ | 375/347 |
| 5,692,018 A * | 11/1997 | Okamoto | .................... | 375/347 |
| 5,974,301 A * | 10/1999 | Palmer et al. | .............. | 455/63.1 |
| 6,081,566 A * | 6/2000 | Molnar et al. | ............... | 375/347 |
| 6,968,171 B2 * | 11/2005 | Vanderhelm et al. | ........ | 455/296 |
| 7,336,745 B2 * | 2/2008 | Casabona et al. | .......... | 375/346 |
| 7,373,129 B2 * | 5/2008 | Fukuda et al. | ............. | 455/296 |
| 7,385,944 B2 * | 6/2008 | Kong et al. | ................. | 370/328 |
| 2005/0085204 A1 * | 4/2005 | Poilasne et al. | .......... | 455/193.1 |
| 2006/0268964 A1 * | 11/2006 | Song et al. | ................... | 375/148 |

\* cited by examiner

*Primary Examiner*—Blane J Jackson
(74) *Attorney, Agent, or Firm*—McAndrews, Held & Malloy, Ltd.

(57) ABSTRACT

Methods and systems for blocker attenuation using multiple receive antennas are disclosed. Aspects of one method may include receiving wideband signals multi-antenna receiver. The receiver may process received signals that may comprise blocking signals received via the multiple antennas. The blocker received by a first antenna may be suppressed, at least in part, by combining processed signals received by a first antenna with processed signals received by a second antenna. The combining may comprise, for example, adding the two processed signals at either the RF or IF frequencies. The processing of the signals whose blocker is to be suppressed may be gain adjustment. The processing of the other signals used to suppress the blocker of the first antenna may be gain and/or phase adjustment. Accordingly, a blocker received by any antenna may be suppressed, at least in part, by using processed signals received by another antenna.

24 Claims, 6 Drawing Sheets

US 7,634,246 B2

METHOD AND SYSTEM FOR BLOCKER ATTENUATION USING MULTIPLE RECEIVE ANTENNAS

CROSS-REFERENCE TO RELATED APPLICATIONS/INCORPORATION BY REFERENCE

This application makes reference to:
U.S. application Ser. No. 11/536,678, filed Sep. 29 2006;
U.S. application Ser. No. 11/536,682, filed Sep. 29, 2006;
U.S. application Ser. No. 11/536,650, filed Sep. 29, 2006;
U.S. application Ser. No. 11/536,644, filed Sep. 29, 2006;
U.S. application Ser. No. 11/536,676, filed Sep. 29, 2006;
U.S. application Ser. No. 11/536,659, filed Sep. 29, 2006;
U.S. application Ser. No. 11/536,673, filed Sep. 29, 2006;
U.S. application Ser. No. 11/536,679, filed Sep. 29, 2006;
U.S. application Ser. No. 11/536,670, filed Sep. 29, 2006;
U.S. application Ser. No. 11/536,672, filed Sep. 29, 2006;
U.S. application Ser. No. 11/536,648, filed Sep. 29, 2006;
U.S. application Ser. No. 11/536,669, filed Sep. 29, 2006;
U.S. application Ser. No. 11/536,666, filed Sep. 29, 2006;
U.S. application Ser. No. 11/536,675, filed Sep. 29, 2006;
U.S. application Ser. No. 11/536,685, filed Sep. 29, 2006;
U.S. application Ser. No. 11/536,645, filed Sep. 29, 2006;
U.S. application Ser. No. 11/536,655, filed Sep. 29, 2006;
U.S. application Ser. No. 11/536,660, filed Sep. 29, 2006;
U.S. application Ser. No. 11/536,657, filed Sep. 29, 2006;
U.S. application Ser. No. 11/536,662, filed Sep. 29, 2006;
U.S. application Ser. No. 11/536,667, filed Sep. 29, 2006;
U.S. application Ser. No. 11/536,651, filed Sep. 29, 2006;
U.S. application Ser. No. 11/536,656, filed Sep. 29, 2006; and
U.S. application Ser. No. 11/536,663, filed Sep. 29, 2006.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication More specifically, certain embodiments of the invention relate to a method and system for blocker attenuation using multiple receive antennas.

BACKGROUND OF THE INVENTION

Wireless devices have used antennas to receive RF signals. However, signals received by an antenna may be affected by a transmission path taken by the signals, as well as by characteristics of the receive antenna. For example, the transmission path may comprise obstacles, such as, for example, buildings and/or trees that reflect and/or attenuate transmitted signals. Additionally, the receive antenna may also receive interfering signals in the desired channel that may reduce the signal-to-noise ratio (SNR) of at least a portion of the received bandwidth, thereby increasing the difficulty of demodulating the desired signal. If the interfering signals are strong enough, the receiving wireless device may not be able to de-modulate the desired signal from the desired channel. These interfering signals may be referred to as blocking signals or blockers.

Multi-antenna designs have increased the ability to transmit and receive RF signals more robustly, that is, with more throughput and fewer errors without using more power. While the use of multiple transmit and/or receive antennas is designed to introduce a diversity gain and array gain, blockers may disrupt reception and demodulation of RF signals.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for blocker attenuation using multiple receive antennas, substantially as shown in and/or described in connection with at least one of the figures, as set forth more completely in the claims.

Various advantages, aspects and novel features of the present invention, as well as details of an illustrated embodiment thereof, will be more fully understood from the following description and drawings

DETAILED DESCRIPTION OF THE INVENTION

Certain embodiments of the invention may be found in a method and system for blocker attenuation using multiple receive antennas. Aspects of the method may comprise receiving signals by a wideband diversity radio frequency (RF) receiver comprising a plurality of receiving antennas. The receiver may process received signals that may comprise a blocking signal, where the received signals may be received via one of the multiple antennas. The receiver may also process received signals, received via another of the multiple antennas, which may comprise another blocking signal. The blocker received by a first antenna may be suppressed, at least in part, by combining processed signals received by one antenna with processed signals received by another antenna. The combining may comprise, for example, adding the two processed signals at either the RF or corresponding IF. The processing of the signals whose blocker is to be suppressed may comprise gain adjustment. The processing of the signals that is to be used to suppress the blocker of the other antenna may be gain and/or phase adjustment.

Figure 1:
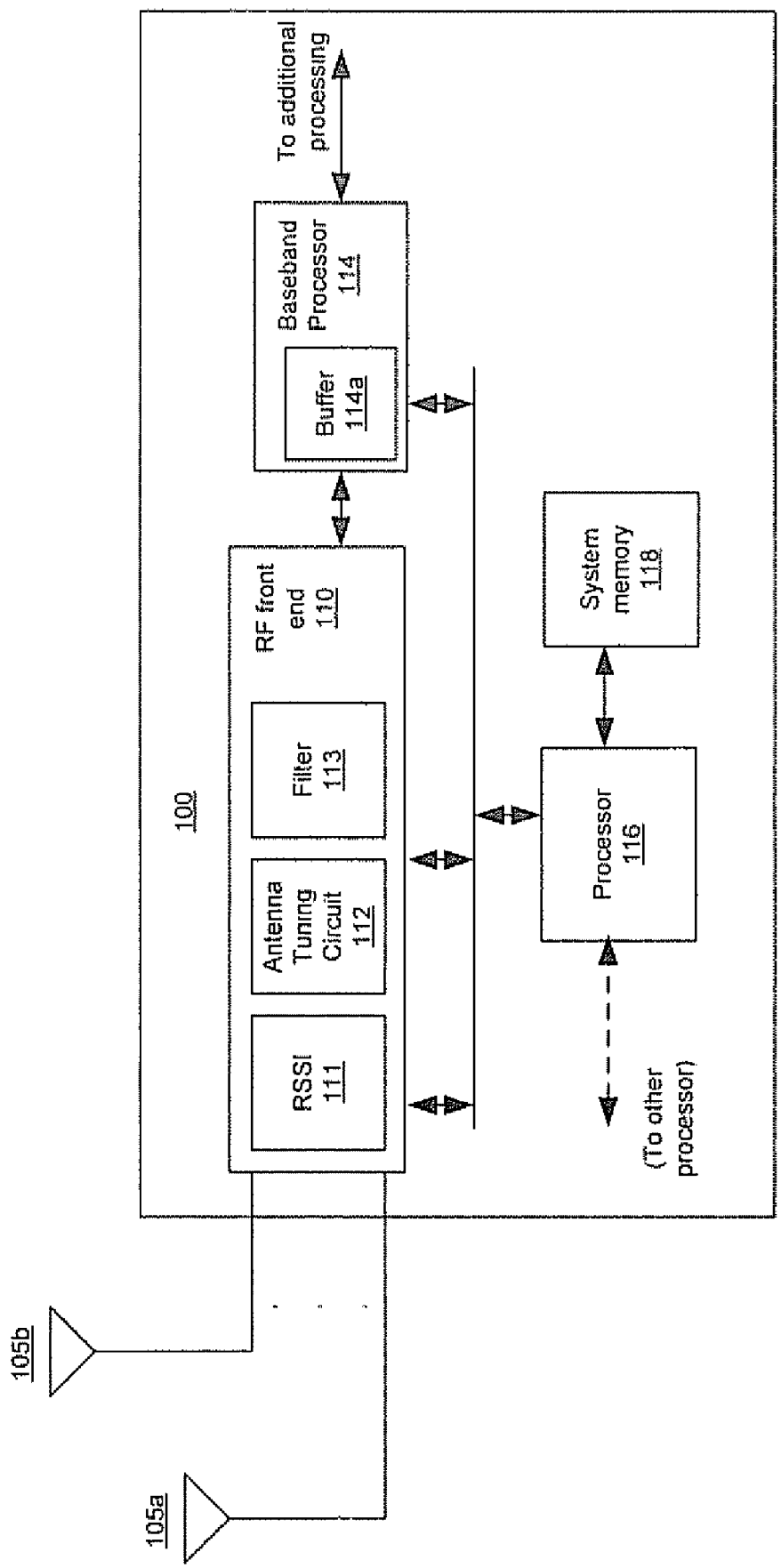
FIG. 1 is a block diagram of a wireless terminal, in accordance with an embodiment of the invention.

FIG. 1 is a block diagram of an exemplary wireless terminal, in accordance with an embodiment of the invention. Referring to FIG. 1, there is shown a wireless terminal 100, which may comprise, for example, a plurality of antennas 105a . . . 105b, a RF front end 110, a baseband processor 114, a processor 116, and a system memory 118. The RF front end 110 may comprise suitable logic, circuitry, and/or code that may be adapted to process received RF signals and/or RF signals to be transmitted. The RF front end 110 may be coupled to the antenna 105 for signal reception and/or transmissions. The RF front end 110 may comprise an received signal strength indicator (RSSI) circuit 111, an antenna tuning circuit block 112, and a filter circuit 113.

The RSSI circuit 111 may comprise suitable logic, circuitry, and/or code that may be adapted to enable generation of received signal strength. The RSSI circuit 111 may generate received signal strength indications for a wide bandwidth spectrum and for a narrow bandwidth spectrum. The wide bandwidth spectrum may be, for example, the bandwidth for a WCDMA transmission while the narrow bandwidth spectrum may be, for example, to detect signal strength of a blocker. For example, if there is no blocker, the narrow bandwidth signal strength indication may be substantially similar to the broad bandwidth signal strength indication. However, in the presence of a blocker within the wide bandwidth spectrum, the narrow bandwidth signal strength indication may be substantially larger than the signal strength indication for the wide bandwidth. Determination of a difference between the narrow bandwidth signal strength indication may differ from the wide bandwidth signal strength indication may be design and/or implementation dependent. The presence of a blocker may be determined by, for example, the baseband processor 114 and/or the processor 116 by processing the signal strengths of the wide bandwidth spectrum and the narrow bandwidth spectrum.

The RSSI circuit 111 may be able to generate a signal strength indication for the narrow bandwidth spectrum by varying the frequency range of the narrow bandwidth spectrum. Accordingly, the RSSI circuit 111 may detect a blocker at various frequency ranges within the wide bandwidth spectrum. An embodiment of the invention may vary the frequency range for the narrow bandwidth spectrum by, for example, bandpass filtering received signals in the wide bandwidth spectrum. The bandpass filter bandwidth may be indicated and/or controlled by, for example, the processor 116 and/or the baseband processor 114. Accordingly, the RSSI circuit 111 may generate a wide bandwidth signal strength indication and a narrow bandwidth signal strength indication for signals received by each of the antennas 105a . . . 105b.

The antenna tuning circuit block 112 may comprise suitable logic, circuitry, and/or code that may be adapted to adjust a center frequency for each of the antennas 105a . . . 105b that may be in use. an exemplary description of dynamic tuning of an antenna is disclosed in U.S. patent application Ser. No. 11/536,678, which is filed on even date herewith and is incorporated by reference in its entirety. The filter circuit 113 may comprise suitable logic, circuitry, and/or code that may be adapted to band pass filter RF and/or IF frequencies. The filter circuit 113 may be adjusted to change, for example, bandpass frequencies. The adjustment of bandpass characteristics may be indicated and/or controlled by, for example, the processor 116 and/or the bandpass processor 114.

With respect to received signals, the RF front end 110 may demodulate the received signals before further processing. Moreover, the RF front end 110 may comprise other exemplary RF processing functions, such as, filtering the received signal, amplifying the received signals, and/or downconverting the received signals to intermediate frequency, very low intermediate frequency (VLIF) signal, and/or baseband signal. The RE front end 110 may comprise a IF processor which may digitize an IF signal, and digitally process the digitized IF signal to filter and/or downconvert the digitized IF signal to a digital baseband signal. The IF processor may then convert the digitized baseband signal to an analog baseband signal.

The RF front end 110 may also receive digital or analog baseband signals from, for example, the baseband processor 114. For example, the baseband processor 114 may generate one or more signals that may be communicated to the RF front end 110, which may be utilized to control one or more functions executed by the RF front 110. Accordingly, in one embodiment of the invention, one or more signals generated by the baseband processor 114 and/or processor 116 may be utilized to program various components such as, for example, filters, phase lock loops (PLLs) or synthesizers, in the RF front end 110. The RF front end 110 may appropriately filter, amplify, and/or modulate an analog signal for transmission via the antenna 105. The RE front end 110 may also convert a digital signal to an analog signal as part of processing for transmission.

The baseband processor 114 may comprise suitable logic, circuitry, and/or code that may be adapted to process analog or digital baseband signals generated by the RF front end 110. The baseband processor 114 may also communicate baseband signals to the RF front end 110 for processing before transmission. The baseband processor 114 may also comprise a buffer 114a that may be used to store received data and/or data to be transmitted. The processor 116 may comprise suitable logic, circuitry, and/or code that may be adapted to control the operations of the RF front end 110, the antenna tuning circuit 112, and/or the baseband processor 114. For example, the processor 116 may be utilized to update and/or modify programmable parameters and/or values in a plurality of components, devices, and/or processing elements in the RF front end 110, the antenna tuning circuit 112, and/or the baseband processor 114. Exemplary programmable parameters may comprise gain of an amplifier, phase of a phase adjusting block, bandwidth of a filter, and/or PLL parameters. Control and/or data information may be transferred from another controller and/or processor in the wireless terminal 100 to the processor 116. Similarly, the processor 116 may transfer control and/or data information to another controller and/or processor in the wireless terminal 100.

The processor 116 may utilize the received control and/or data information to determine the mode of operation of the RF front end 110. For example, the processor 116 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 118 via the controller/processor 116. This information stored in system memory 118 may be transferred to the RF front end 110 from the system memory 118 via the controller/processor 116.

The system memory 118 may comprise suitable logic, circuitry, and/or code that may be adapted to store a plurality of control and/or data information, including parameters needed to calculate frequencies and/or gain, and/or the frequency value and/or gain value. The system memory 118 may also store, for example, various parameters for enabling and/or or disabling RF processing circuitry as well as for controlling antenna hopping. The antenna hopping parameters may comprise, for example, various antenna tuning circuit parameters to determine center frequencies and bandwidths of the antenna 105, as well as impedance match the antenna 105 to the RF front end 110. an exemplary description of antenna hopping is disclosed further in U.S. patent application Ser. No. 11/536,682, which is filed on even date herewith and is incorporated by reference in its entirety.

The wireless terminal 100 may support wireless protocols that require multiple antennas for reception and transmission, such as, for example, WCDMA. Accordingly, the RF front end 110 may comprise separate RF processing circuitry for processing RF signals received via, for example, the antennas 105a ... 105b, and for processing signals to be transmitted via the antennas 105a ... 105b. The RF processing circuitry may, for example, amplify, phase adjust, filter, modulate, and/or demodulate analog signals. The RF processing circuitry may also, for example, upconvert and/or downconvert between RF frequencies, IF frequencies, and baseband frequencies.

In operation, RF signals may be received and transmitted by the wireless terminal 100 via the antenna 105a ... 105b If the wireless terminal 100 is receiving WCDMA signals, the WCDMA signals may be received by the plurality of antennas 105a ... 105b. Similarly, if the wireless terminal 100 is transmitting WCDMA signals, the WCDMA signals may be transmitted by the plurality of antennas 105a ... 105b. The RF signals to, or from, the antennas 105a ... 105b may be processed by separate RF processing circuitry.

The antenna tuning circuit 112 may present an impedance to the antenna 105, and accordingly, the antenna 105 in conjunction with the antenna tuning circuit 112 may have a center frequency and a bandwidth about the center frequency. The antenna tuning circuit 112 may also impedance match the antenna 105 to the RF front end 110. Accordingly, the antenna 105 may present optimal reception for those signals within the bandwidth.

However, various environmental conditions may cause the center frequency to drift from the desired center frequency. For example, if the wireless terminal 100 is a mobile terminal, the inductive or capacitive characteristics of a user's hand holding the mobile terminal may change the center frequency. The wireless terminal 100 may detect the center frequency drift and may dynamically configure the antenna tuning circuit block 112 in order to bring the center frequency closer to a desired center frequency. The RF front end 110, which may receive weak signals at the desired frequencies, may be enabled to detect the center frequency drift, for example. The center frequency drift may also be detected, for example, by processing the received signals. For example, the baseband processor 114 may detect an increase in bit error rate of the received packets, which may be indicative of center frequency drift.

The signal strength indication and/or bit error rate may be communicated to the processor 116, and the processor 116 may determine that the antenna tuning circuit block 112 may need to be reconfigured. Accordingly, the processor 116 may communicate appropriate control and/or data to the antenna tuning circuit block 112 to reconfigure and/or retune the antenna tuning circuit block 112. By processing information regarding the received signals, the processor 116 may dynamically adjust the center frequency in order to reduce the effects of center frequency drift. The processor 116 may also reconfigure the antenna tuning circuit block 112 to adjust the bandwidth of the antenna 105 and/or impedance matching of the antenna 105 and the RF front end 110

While FIG. 1 may have been described as communicating to at least one other processor or controller, the invention need not be so limited. Accordingly, there may be instances when the processor 116 may not have to communicate with other processors in controlling RF communications. For example, a design of the wireless terminal may not utilize other processors than the processor 116 or the processor 116 may have access to all information needed to control RF communications. Additionally, the RSSI circuit 111 may have been shown as part of the RF front end 110. The invention need not be so limited. For example, the RSSI circuit 111 may be before the RF front end 110, part of the RF front end 110, and/or after the RF front end 110.

Figure 2A:
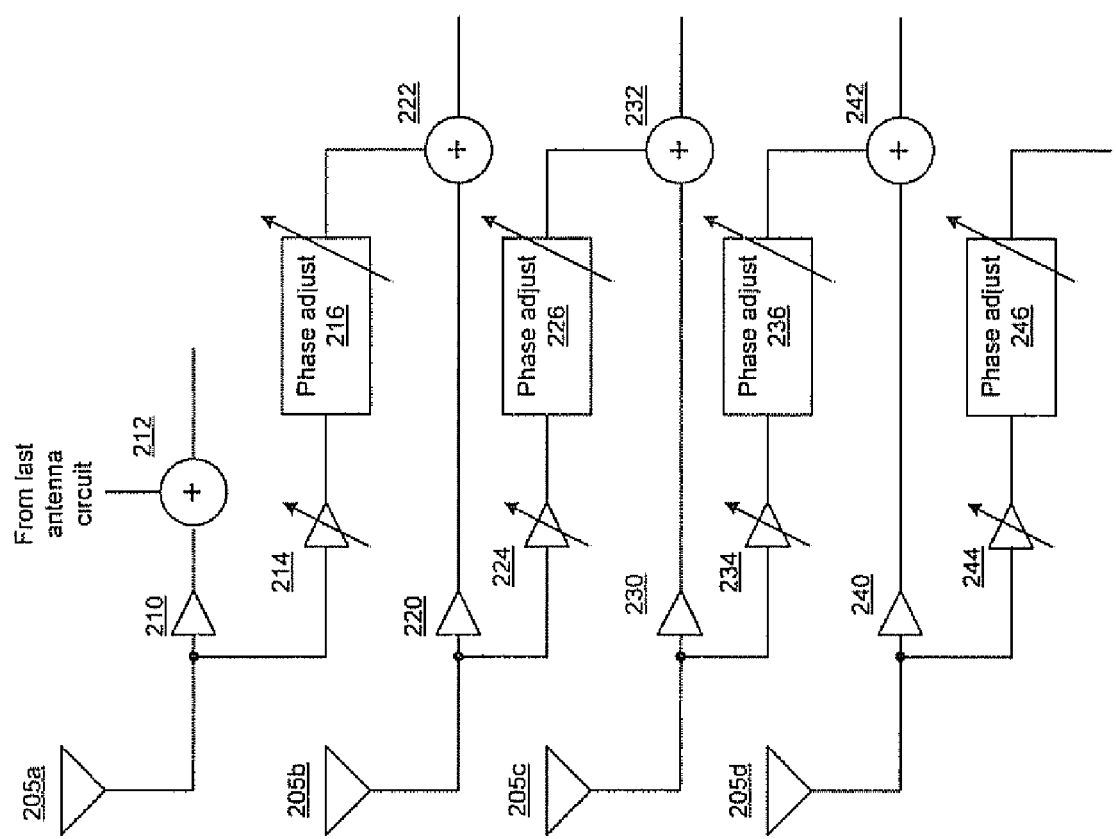
FIG. 2A is a block diagram illustrating exemplary circuitry that may be used for blocker attenuation, in accordance with an embodiment of the invention.

FIG. 2A is a block diagram illustrating exemplary circuitry that may be used for blocker attenuation, in accordance with an embodiment of the invention. Referring to FIG. 2A, there is shown a plurality of antennas 205a, 205b, 205c, and 205d, low noise amplifiers (LNAS) 210, 214, 220, 224, 230, 234, 240, and 244, signal combiners 212, 222, 232, and 242, and phase adjuster blocks 216, 226, 236, and 246. The LNAs 210, 214, 220, 224, 230, 234, 240, and 244 may comprise suitable logic, circuitry, and/or code that may be adapted to amplify RF signals received by, for example, the antennas 205a, 205b, 205c, and 205d. In an embodiment of the invention, the LNAs 210, 220, 230, and 240 may have a fixed gain while the LNAs 214, 224, 234, and 244 may have variable gains. However, the invention need not be so limited. For example, other embodiments of the invention may be able to adjust a gain of each of the LNAs 210, 214, 220, 224, 230, 234, 240, and 244.

An indication of the gain of each of the variable gain LNAs 214, 224, 234, and 244 may be provided by, for example, the baseband processor 114 and/or the processor 116. For example, the baseband processor 114 may communicate appropriate signals to the LNA 214, which may be utilized to increase, decrease or maintain an output gain of the LNA 214. The signal combiners 212, 222, 232, and 242 may comprise suitable circuitry that may enable, for example, combining two analog signals. The phase adjuster blocks 216, 226, 236, and 246 may comprise suitable logic, circuit, and/or code that may be adapted to process an input analog signal to generate an output analog signal with a desired phase. The amount of phase adjustment that may be required may be indicated by, for example, the baseband processor 114 and/or the processor 116. For example, the baseband processor 114 may generate various signals, which may be communicated to the phase adjuster block 216 so as to adjust the phase of the output analog signal with respect to the input analog signal.

In operation, the antennas 205a, 205b, 205c, and 205d may receive RF signals, such as, for example, WCDMA signals from a WCDMA cell site (not shown). The received RF signals may comprise desired signals and an undesired blocker. The desired signals and the undesired blocker may be received, for example, at varying strengths and phases by each of the antennas 205a, 205b, 205c, and 205d. Accordingly, it may be desirable to attenuate the blockers received by antennas 205a, 205b, 205c, and 205d. The presence of a blocker may be indicated by, for example, an increase in bit error rate (BER, and/or a decrease in signal-to-noise ratio (SNR). Another exemplary manner in which the presence of a blocker may be identified is to determine when a received signal strength indication (RSSI) for the desired wide bandwidth spectrum is less than a RSSI for a narrow bandwidth spectrum. This is discussed with respect to FIG. 4. The wide bandwidth signal strength indication and the narrow bandwidth signal strength indication may be generated by, for example, the RSSI circuit 111. Accordingly, the RSSI circuit 111 may generate separate wideband and narrowband signal strength indications for signals received from each of the antennas 205a, 205b, 205c, and 205d.

The RF signals received from an antenna, for example, the antenna 205a, may be appropriately adjusted in gain and/or phase by the LNA 214 and the phase adjuster block 216, respectively, and communicated to the signal combiner 222. The RF signals received from another antenna, for example, the antenna 205b, may be amplified by, for example, the LNA 220, and the amplified RF signal may be communicated to the signal combiner 222. The signal combiner 222 may combine the signals received by the antennas 205a and 205b to generate an output signal. The output signal may be further processed by the RF front end 110. The output signal from the signal combiner 222 may also be processed by the RSSI circuit 111 to generate a wide bandwidth signal strength indication and a narrow bandwidth signal strength indication.

A processor, for example, the processor 116, may process the signal strength indications to determine further gain and/or phase adjustments for the LNA 214 and the phase adjuster block 216, respectively. By appropriately adjusting the gain and phase of the received signal from the antenna 205a, the blocker received by the antenna 205a may be used to attenuate the blocker received by the antenna 205b to a satisfactory level. The amount of attenuation desired may be design and/or implementation dependent.

Similarly, the blocker received by the antenna 205c may be attenuated by combining it with appropriately processed signals received from the antennas 205b The received signal from the antenna 205b may be processed by the LNA 224 and the phase adjuster block 226, and combined with the amplified signal from the LNA 230 by the signal combiner 232. The blocker received by the antenna 205d may be attenuated in a similar manner by combining it with appropriately processed signals received from the antennas 205c. The received signal from the antenna 205c may be processed by the LNA 234 and the phase adjuster block 236, and combined with the amplified signal from the LNA 240 by the signal combiner 242. The blocker received by the antenna 205a may also be attenuated by combining it with appropriately processed signals received from the antennas 205d. The received signal from the antenna 205d may be processed by the LNA 244 and the phase adjuster block 246, and combined with the amplified signal from the LNA 210 by the signal combiner 212. Accordingly, each antenna in a multiple antenna wireless terminal may reduce a blocker by using appropriately processed signal from another antenna, where signals for each antenna may be independently processed.

While an embodiment of the invention may have been described with respect to FIG. 2A, the invention need not be so limited. Other embodiments of the invention may be used for a number of antennas other than four antennas. Additionally, other embodiments of the invention may group functionalities described with respect to FIG. 2A in other ways. For example, in another embodiment of the invention, a phase of the RF signals may be adjusted before amplifying the signal. Another exemplary embodiment of the invention may combine the phase adjustment and gain circuitry into one circuit block.

Figure 2B:
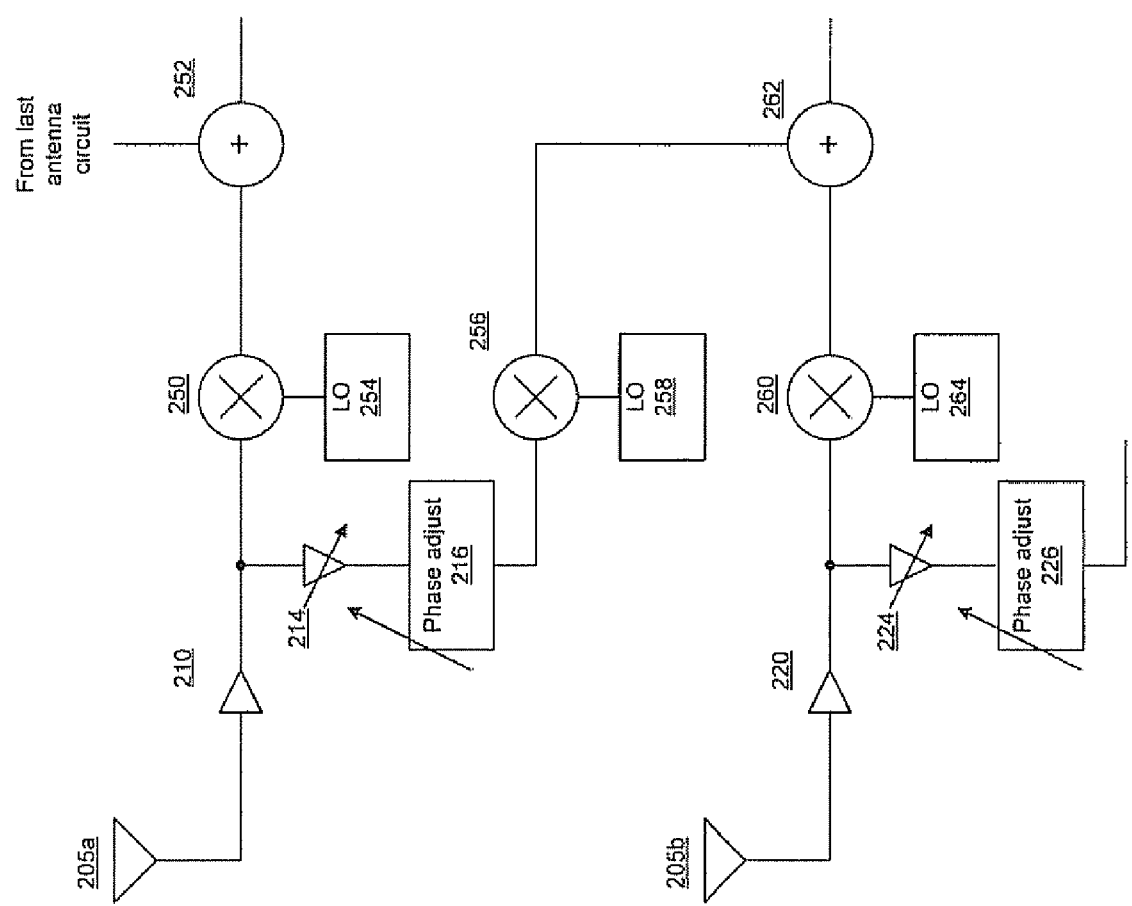
FIG. 2B is a block diagram illustrating exemplary circuitry that may be used for blocker attenuation, in accordance with an embodiment of the invention.

FIG. 2B is a block diagram illustrating exemplary circuitry that may be used for blocker attenuation, in accordance with an embodiment of the invention. Referring to FIG. 2B, there is shown the antennas 205a and 205b, the LNAs 210, 214, 220, and 224, the phase adjust blocks 216 and 226, mixers 250, 256, 264, local oscillators 254, 258, and 264, and signal combiners 252 and 262. Blocker attenuation may be performed in a method similar to the method described with respect to FIG. 2A. However, rather than remove a blocker from the received RF signal, the blocker may be removed after down converting the RF signal to, for example, an IF signal. The signal strength indication for the wide bandwidth spectrum and the narrow bandwidth spectrum may accordingly be determined by, for example, the RSSI circuit 111 using the IF signal.

In operation, the antenna 205b may receive wideband RF signals in the desired frequency range that may include a blocker. The received RF signals may be amplified by the LNA 220 and communicated to the mixer 260. The mixer 260 may mix the amplified RF signals with a signal from the local oscillator 264. The IF signals output by the mixer 260 may be communicated to the signal combiner 262. Signals received by the antenna 205a, which may have been down converted by the mixer 256, may be communicated to the signal combiner 262. The signal combiner 262 may combine the signals received by the antennas 205a and 205b to generate an output signal. The output signal may be further processed by the RF front end 110. The output signal from the signal combiner 222 may also be processed by the RSSI circuit 111 to generate a wide bandwidth signal strength indication and a narrow bandwidth signal strength indication.

A processor, for example, the processor 116, may process the signal strength indications to determine further gain and/or phase adjustments for the LNA 214 and the phase adjuster block 216, respectively. By appropriately adjusting the gain and phase of the received signal from the antenna 205a, the blocker received by the antenna 205a may be used to attenuate the blocker received by the antenna 205b to a satisfactory level. The amount of attenuation desired may be design and/or implementation dependent.

In a similar manner, the blocker received by the antenna 205a may be independently attenuated by appropriate gain and phase adjustment of the output signal of the LNA 220. Accordingly, the signal combiner 252 may combine the signals received by the antennas 205a and 205b to generate an output signal. The output signal may be used to generate a wide bandwidth signal strength indication and a narrow bandwidth signal strength indication. The processor 116, for example, may process the signal strength indications to determine further phase and/or gain adjustments for appropriate attenuation of the blocker received by the antenna 205a.

While an embodiment of the invention may have been described with respect to FIG. 2B, the invention need not be so limited. Other embodiments of the invention may use more than two antennas. Additionally, other embodiments of the invention may group functionalities described with respect to FIG. 2B in other ways. For example, another embodiment may phase adjust RF signals before amplifying the signal, or after down-converting by, for example, the mixer 256. Another embodiment of the invention may combine the phase adjustment and gain circuitry into one circuit block. Another embodiment of the invention may incorporate the phase adjustment functionality into the local oscillator block 258, for example. Accordingly, the phase of the signal from the local oscillator block 258, for example, may be adjusted before being communicated to the mixer 256.

Although FIG. 2B does not illustrate I and Q components of the IF signals, the invention need not be limited in this manner. Accordingly, the I and Q components of the IF signal may also be utilized. For example, blocker attenuation may be generalized to I and Q components for signals received from each antenna. Accordingly, the I component of one antenna may be used to reduce a blocker for the I component of another antenna, and similarly for the Q components.

Figure 3:
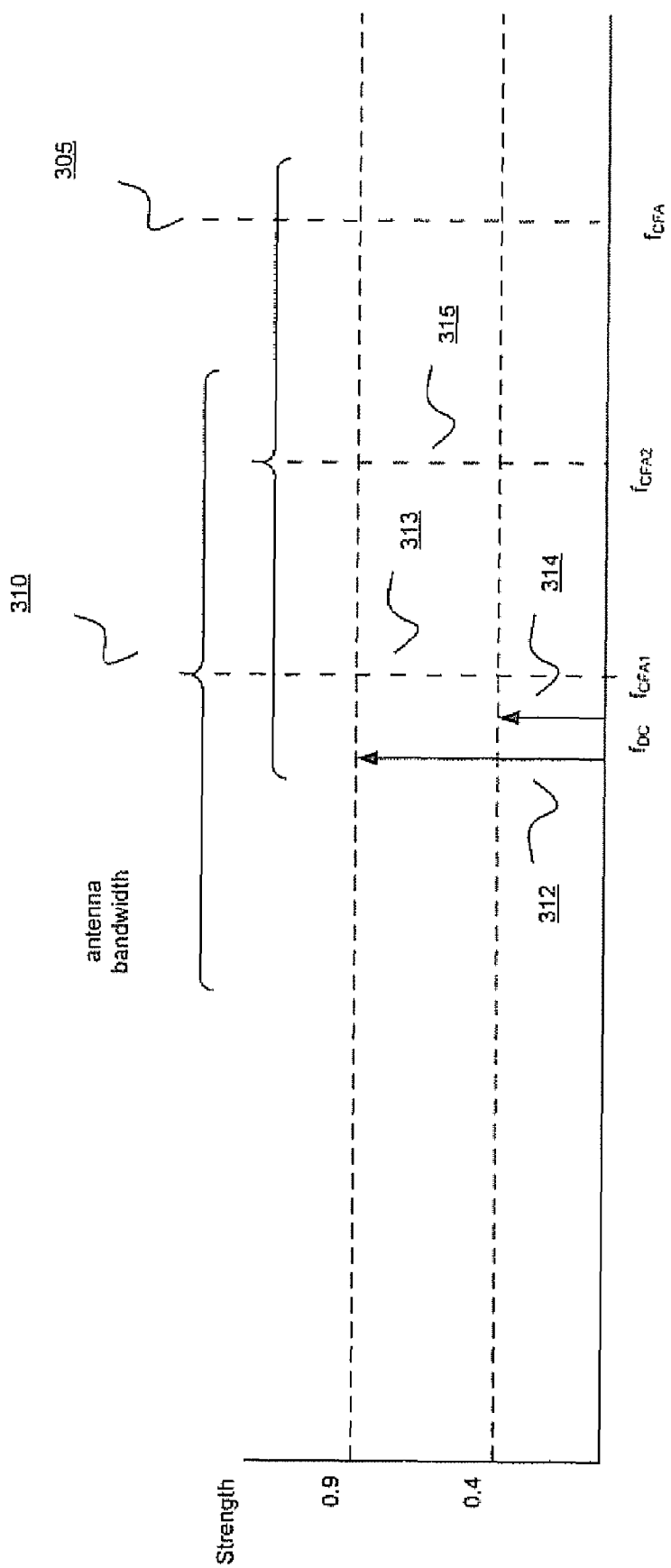
FIG. 3 is a chart illustrating exemplary signal strengths for a channel as a center frequency is changed due to antenna hopping, in accordance with an embodiment of the invention.

FIG. 3 is a chart illustrating exemplary signal strengths for a channel as a center frequency is changed due to antenna hopping, in accordance with an embodiment of the invention. Referring to FIG. 3, there is shown a chart where the horizontal axis indicates frequency and the vertical axis indicates signal strength. If there is a frequency offset between the desired channel and the center frequency of, for example, the antenna 105a, the wireless terminal 100 may not be able to determine the frequency offset. Accordingly, in an embodiment of the invention, after switching to an antenna, for example, the antenna 105a, the wireless terminal 100 may antenna hop by tuning the antenna 105a to change the center frequency of the antenna 105a to various frequencies.

For example, the desired channel frequency, and the desired center frequency, may be at the frequency $f_{DC}$ while the actual center frequency may have drifted to, for example, actual center frequency 305 of $f_{CF4}$. While the wireless terminal 100 may have no indication that the actual center frequency 305 is a different frequency than the desired center frequency, an antenna hopping algorithm may still be applied. Accordingly, signals for the desired channel may be received for various center frequencies. For example, the first antenna hop may configure the antenna tuning circuit 112 to a center frequency 313 at the frequency $f_{CA1}$. Since the center frequency 313 may be close to the desired channel frequency $f_{DC}$, the signal strength 312 for the desired channel for the center frequency $f_{CA1}$ may be a normalized value of 0.9.

The next antenna hop may configure the antenna tuning circuit 112 to a center frequency 315 at the frequency $f_{CA2}$. Since the center frequency 315 may be farther away from the desired channel frequency $f_{DC}$ than the center frequency 313 may be from the desired channel frequency $f_{DC}$, the signal strength 314 for the desired channel for the center frequency $f_{CA2}$ may be at a smaller normalized value of 0.4. Antenna hops may be configured so that adjacent antenna bandwidths may overlap. For example, the antenna bandwidth associated with the center frequency 313 may overlap a portion of the antenna bandwidth associated with the center frequency 315.

In this manner, the wireless terminal 100 may be able to receive signals for the desired channel from different center frequencies associated with the antenna 105a at various times. Accordingly, the wireless terminal 100 may be able to compensate for center frequency drift without knowing the specific amount of drift. The wireless terminal 100 may be able to use antenna hopping to increase signal strength for received desired signals, which may reduce the amount of attenuation of a blocker received with the desired signals.

Figure 4:
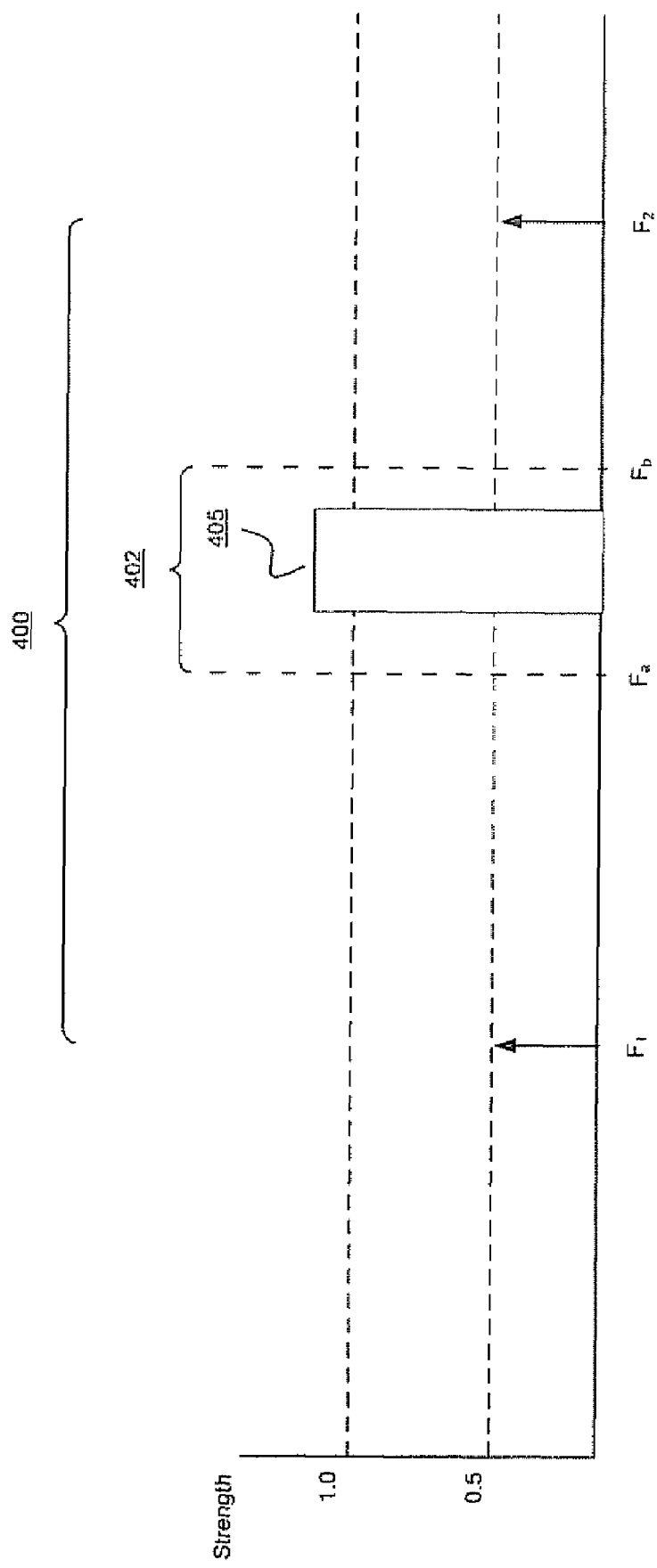
FIG. 4 is an exemplary diagram illustrating a blocker in desired signals, in accordance with an embodiment of the invention.

FIG. 4 is an exemplary diagram illustrating a blocker in desired signals, in accordance with an embodiment of the invention. Referring to FIG. 4, there is shown a chart where the horizontal axis indicates frequency and the vertical axis indicates signal strength. For example, a desired wide bandwidth spectrum 400 for WCDMA may be from frequency $F_1$ to frequency $F_2$. The wide bandwidth spectrum 400 may generally have, for example, a normalized signal level of 0.5. Unwanted blocker 405 may also have been received long with desired signals within the wide bandwidth spectrum 400. The blocker 405 may exist within a narrow bandwidth spectrum 402 of frequency $F_a$ to frequency $F_b$. The signal strength within the frequency range $F_a$ to $F_b$ may have a normalized signal level of 1. Accordingly, the blocker 405 may saturate the RF front end 110 such that desired signals within a portion of the frequency range $F_a$ to $F_b$ may not be recovered.

However, by using the method described with respect to FIG. 2A and/or FIG. 2B, for example, the blocker 405 may be attenuated. Accordingly, the signal strength level for the narrow bandwidth spectrum 402 from frequency $F_a$ to frequency $F_b$ may decrease as the blocker 405 gets attenuated. As the blocker 405 gets attenuated, the signal strength level for the wide bandwidth spectrum 400 from frequency $F_1$ to frequency $F_2$ may also decrease. However, the signal strength level for the wide bandwidth spectrum 400 may not decrease as much as the signal strength level for the narrow bandwidth spectrum 402. Accordingly, as the narrow bandwidth signal strength approaches the wide bandwidth signal strength, a processor, for example, the processor 116 may determine that the blocker 405 may have been attenuated sufficiently.

Figure 5:
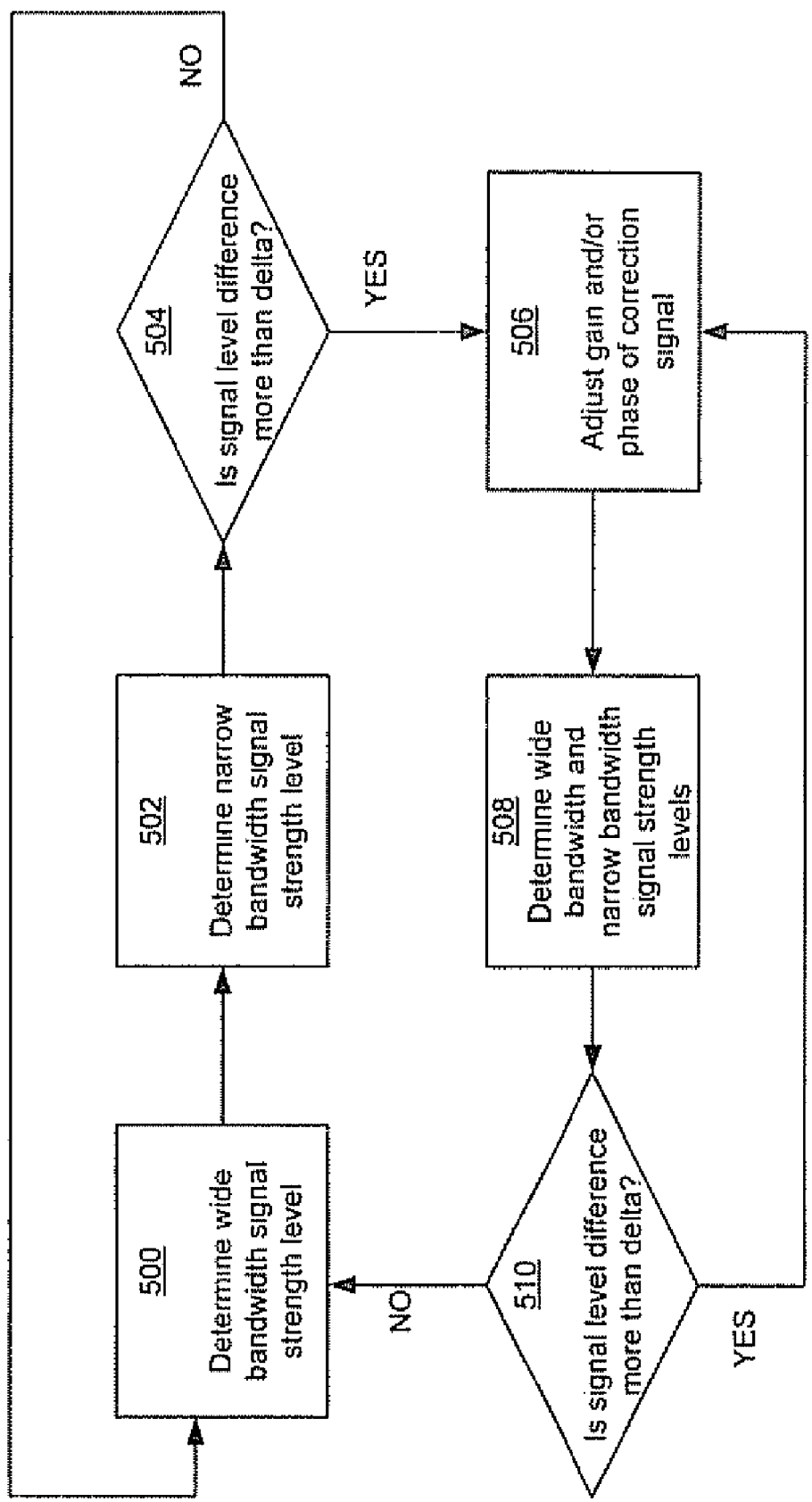
FIG. 5 is a flow diagram of exemplary steps for blocker attenuation, in accordance with an embodiment of the invention.

FIG. 5 is a flow diagram of exemplary steps for blocker attenuation, in accordance with an embodiment of the invention. Referring to FIG. 5, there is shown steps 500 to 510 for reducing a blocker received by the antenna 205b with signals received by the antenna 205a. In step 500, the wireless terminal 100 may receive signals via the antennas 205a and 205b. The RSSI circuit 111 may determine a wide bandwidth signal strength level for signals received via the antenna 205b. In step 502, the RSSI circuit 111 may determine a narrow bandwidth signal strength for signals received via the antenna 205b. The RSSI circuit 111 may determine a plurality of narrow bandwidth signal strengths since, for example, the wide bandwidth spectrum may comprise multiple narrow bandwidths. Accordingly, the processor 116 may, for example, configure the filter circuit 113 to bandpass desired narrow bandwidth spectrums of frequencies from frequency $F_1$ to frequency $F_2$. The processor 116 may, for example, compare the narrow bandwidth signal levels to select the largest narrow bandwidth signal level.

In step 504, the processor 116 may compare, for example, the largest narrow bandwidth signal level with the wide bandwidth signal level. If the difference in signal levels is greater than a specific value, the next step may be step 506. Otherwise, the next step may be step 500. The specific value may be may be pre-determined, or dynamically determined. Dynamic determination may be based on, for example, signal strength of the wide bandwidth spectrum, bit error rate, and/or throughput. In step 506, the processor 116, for example, may adjust a gain of the LNA 214 and/or the phase adjustment for the phase adjust block 216. Accordingly, the RF signal received by the antenna 205a may be adjusted in signal strength and/or phase and combined with the amplified RF signal received by the antenna 205b. In step 508, the RSSI circuit 111 may determine the wide bandwidth signal strength level. The RSSI circuit 111 may also determine the signal strength level for the narrow bandwidth spectrum determined in step 502 to have the largest signal strength level. In step 510, the signal strength levels may be compared. If the difference between the signal strength levels is greater than a specific value, the next step may be step 506. Otherwise, the next step may be step 500.

Although FIG. 5 discloses an exemplary embodiment of the invention, the invention need not be limited so. For example, the narrow bandwidth signal strength level may be determined for all narrow bandwidth spectrums in step 508, rather than just for the narrow bandwidth spectrum determined in step 502.

In accordance with an embodiment of the invention, aspects of an exemplary system may comprise the wireless terminal 100 processing signals received by, for example, the antenna 105a and 105b. The signals received by the antenna 105a and 105b may comprise blockers. The wireless terminal 100 may enable suppressing, at least in part, the blocker received via the antenna 105a by combining the processed signals received by the antenna 105b with the processed signals received via the antenna 105a Processing of the signals received by the antenna 105a may comprise gain adjustment, while processing of the signals received by the antenna 105b may comprise gain adjustment and/or phase adjustment. The processed signals may be combined at RF frequencies or at IF frequencies. Combining of the signals may comprise, for example, adding of the signals. The wireless terminal 100 may also reconfigure the antennas 105a and 105b to operate via at least one of a plurality of different center frequencies within a specified range when receiving signals.

Another embodiment of the invention may provide a machine-readable storage, having stored thereon, a computer program having at least one code section executable by a machine, thereby causing the machine to perform the steps as described above for blocker attenuation using multiple receive antennas.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. In a wideband diversity radio frequency (RF) device comprising a plurality of receiving antennas, a method for wireless communication, the method comprising:
   processing signals comprising a first desired signal and a first blocking signal received via a first of the plurality of receiving antennas;
   processing signals comprising a second desired signal and a second blocking signal received via a second of the plurality of receiving antennas; and
   suppressing said first blocking signal received via said first antenna by combining said processed signals received via said first antenna with said processed signals received via said second antenna.

2. The method according to claim 1, wherein said processing of said signals received via said second antenna comprises one or both of gain adjustment and/or phase adjustment.

3. The method according to claim 1, wherein said processing of said signals received via said first antenna comprises gain adjustment.

4. The method according to claim 1, wherein said processing of said signals received via said first antenna and via said second antenna occurs at RF frequencies.

5. The method according to claim 1, wherein said processing of said signals received via said first antenna and said second antenna occurs after downconverting said signals received via said first antenna and said second antenna to IF frequencies.

6. The method according to claim 1, wherein said combining comprises adding said processed signals received via said first antenna to said processed signals received via said second antenna.

7. The method according to claim 1, comprising reconfiguring said first antenna to operate via at least one of a plurality of different center frequencies within a specified range when signals are received via said first of the plurality of receiving antennas.

8. The method according to claim 1, comprising reconfiguring said second antenna to operate via at least one of a plurality of different center frequencies within a specified range when signals are received via said second of the plurality of receiving antennas.

9. A machine-readable storage for use in connection with a wideband diversity radio frequency (RF) device comprising a plurality of receiving antennas, the machine-readable storage having stored thereon a computer program having at least one code section for wireless communication, the at least one code section being executable by a machine for causing the machine to perform steps comprising:
   processing signals comprising a first desired signal and a first blocking signal received via a first of the plurality of receiving antennas;
   processing signals comprising a second desired signal and a second blocking signal received via a second of the plurality of receiving antennas; and
   suppressing said first blocking signal received via said first antenna by combining said processed signals received via said first antenna with said processed signals received via said second antenna.

10. The machine-readable storage according to claim 9, wherein said at least one code section comprises code for adjusting one or both of gain and/or phase, of said signals received via said second antenna.

11. The machine-readable storage according to claim 9, wherein said at least one code section comprises code for gain adjusting said signals received via said first antenna.

12. The machine-readable storage according to claim 9, wherein said at least one code section comprises code that enables said combining at RF frequencies.

13. The machine-readable storage according to claim 9, wherein said at least one code section comprises code that enables said combining at IF frequencies.

14. The machine-readable storage according to claim 9, wherein said at least one code section comprises code that enables adding said processed signals received via said first antenna to said processed signals received via said second antenna.

15. The machine-readable storage according to claim 9, wherein said at least one code section comprises code for reconfiguring said first antenna to operate via at least one of a plurality of different center frequencies within a specified range when signals are received via said first of the plurality of receiving antennas.

16. The machine-readable storage according to claim 9, wherein said at least one code section comprises code for reconfiguring said second antenna to operate via at least one of a plurality of different center frequencies within a specified range when signals are received via said second of the plurality of receiving antennas.

17. For use in a wideband diversity radio frequency (RF) device comprising a plurality of receiving antennas, a system for wireless communication, the system comprising:

at least one circuit that enables processing of signals comprising a first desired signal and a first blocking signal received via a first of the plurality of receiving antennas;

said at least one circuit enables processing signals comprising a second desired signal and a second blocking signal received via a second of the plurality of receiving antennas; and said at least one circuit enables suppressing said first blocking signal received via said first antenna by combining said processed signals received via said first antenna with said processed signals received via said second antenna.

18. The system according to claim 17, wherein said processing by said at least one circuit of said signals received via said second antenna comprises one or both of gain adjustment and/or phase adjustment.

19. The system according to claim 17, wherein said at least one circuit enables adjustment of a gain of said signals received via said first antenna.

20. The system according to claim 17, wherein said at least one circuit enables said combining at RF frequencies.

21. The system according to claim 17, wherein said at least one circuit enables said combining at IF frequencies.

22. The system according to claim 17, wherein said at least one circuit enables addition of said processed signals received via said first antenna to said processed signals received via said second antenna.

23. The system according to claim 17, wherein said at least one circuit enables reconfiguring said first antenna to operate via at least one of a plurality of different center frequencies within a specified range when signals are received via said first of the plurality of receiving antennas.

24. The system according to claim 17, wherein said at least one circuit enables reconfiguring of said second antenna to operate via at least one of a plurality of different center frequencies within a specified range when signals are received via said second of the plurality of receiving antennas.

* * * * *

UNITED STATES PATENT AND TRADEMARK OFFICE
CERTIFICATE OF CORRECTION

PATENT NO. : 7,634,246 B2  Page 1 of 1
APPLICATION NO. : 11/536688
DATED : December 15, 2009
INVENTOR(S) : Ahmadreza Rofougaran It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this

Ninth Day of November, 2010

David J. Kappos
*Director of the United States Patent and Trademark Office*